US007213150B1

(12) United States Patent
Jain et al.

(10) Patent No.: US 7,213,150 B1
(45) Date of Patent: May 1, 2007

(54) METHOD AND APPARATUS FOR SECURE MESSAGE QUEUING

(75) Inventors: Namit Jain, Foster City, CA (US); Shailendra K. Mishra, Fremont, CA (US); Bhagat V. Nainani, Foster City, CA (US); Wei Wang, Belmont, CA (US); Debashish Chatterjee, Fremont, CA (US)

(73) Assignee: Oracle International Corp., Redwood Shores, CA (US)

( * ) Notice: Subject to any disclaimer, the term of this patent is extended or adjusted under 35 U.S.C. 154(b) by 813 days.

(21) Appl. No.: 10/044,008

(22) Filed: Jan. 11, 2002

(51) Int. Cl.
*H04L 9/00* (2006.01)
*H04K 1/00* (2006.01)
*G06F 11/30* (2006.01)
*G06F 12/14* (2006.01)
*H04L 9/32* (2006.01)

(52) U.S. Cl. ............... 713/176; 713/180; 713/181; 713/170; 713/168

(58) Field of Classification Search ........ 713/170–201, 713/168; 705/50–56; 380/20–25
See application file for complete search history.

(56) References Cited

U.S. PATENT DOCUMENTS

| 5,974,151 | A  | * | 10/1999 | Slavin | 380/30 |
|---|---|---|---|---|---|
| 6,061,448 | A  | * | 5/2000  | Smith et al. | 380/282 |
| 6,237,096 | B1 | * | 5/2001  | Bisbee et al. | 713/178 |
| 6,314,190 | B1 | * | 11/2001 | Zimmermann | 380/282 |
| 6,671,805 | B1 | * | 12/2003 | Brown et al. | 713/176 |
| 6,904,521 | B1 | * | 6/2005  | Jivsov | 713/155 |
| 6,963,971 | B1 | * | 11/2005 | Bush et al. | 713/153 |
| 2001/0037453 | A1 | * | 11/2001 | Mitty et al. | 713/168 |
| 2002/0004902 | A1 | * | 1/2002  | Toh et al. | 713/170 |
| 2002/0059144 | A1 | * | 5/2002  | Meffert et al. | 705/51 |
| 2002/0143710 | A1 | * | 10/2002 | Liu | 705/75 |
| 2003/0046533 | A1 | * | 3/2003  | Olkin et al. | 713/152 |

* cited by examiner

*Primary Examiner*—Ayaz Sheikh
*Assistant Examiner*—Shin-Hon Chen
(74) *Attorney, Agent, or Firm*—Park, Vaughan & Fleming LLP; Edward J. Grundler

(57) ABSTRACT

One embodiment of the present invention provides a system that facilitates secure messaging. The system starts by creating a message at an origin. Next, the system computes a digest of the message. This digest is signed using an origin private encryption key. The message and the signed digest are forwarded to a queue for delivery to a recipient. Upon receiving the message and the signed digest at the queue, the system verifies that the digest was signed at the origin by using an origin public encryption key. If the signature is valid, the origin cannot deny creating the message. Valid messages and digests are placed on the queue and the recipient is notified that the message is available.

9 Claims, 4 Drawing Sheets

METHOD AND APPARATUS FOR SECURE MESSAGE QUEUING

RELATED APPLICATION

The subject matter of this application is related to the subject matter in a co-pending non-provisional application by Bhagat V. Nainani, Neerja Bhatt, Shailendra K. Mishra, Krishnan Meiyyappan, Namit Jain, and Wei Wang entitled, "Method and Apparatus to Facilitate Access and Propagation of Messages in Queues Using a Public Network," having Ser. No. 10/027,100, and filing date Dec. 19, 2001.

BACKGROUND

1. Field of the Invention

The present invention relates to communications between computer applications. More specifically, the present invention relates to a method and an apparatus to facilitate secure message queuing.

2. Related Art

Computer applications executing on a computing system often need to communicate with other computer applications executing on other computing systems. One method of communicating between these computer applications is to establish a direct link between the computer systems. Establishing direct links from one application to another, however, is impractical because these computer applications may not be executing at the same time.

Another method of communicating between computer applications is to use messaging queues. When using messaging queues, a client can perform a number of operations, including sending a message to a queue or to a list of intended recipients, receiving a message from a queue, and registering to be notified of messages in the queue.

Although using messaging queues to communicate between different processes is effective and can allow computer applications to communicate with each other, even when these computer applications execute at different times, there can be problems in validating whether a specific message was actually sent or received. As an example, suppose that a recipient of a message performs an action in reliance on a message and, at some later time, the originator of the message denies sending the message. Or conversely, suppose that the originator sends a message and at some later time the recipient denies having received the message. In either case, determining the truth is difficult to impossible because of the lack of proof about whether the message was actually sent or received.

Some public key cryptographic systems have attempted to provide a non-repudiation of origination service for computer applications, which are in direct communication with each other. However, non-repudiation of recipient services and services which apply to queuing systems are presently non-existent.

What is needed is a method and an apparatus that provides non-repudiation of both message origination and message receipt within a queuing system.

SUMMARY

One embodiment of the present invention provides a system that facilitates secure messaging. The system starts by creating a message at an origin. Next, the system computes a digest of the message, and then signs the digest using an origin private encryption key. The message and the signed digest are then forwarded to a queue for delivery to a recipient. Upon receiving the message and the signed digest at the queue, the system uses an origin public encryption key to verify that the digest was signed by the origin private encryption key. The signed digest is stored persistently along with the actual message. Hence, if the signature is valid, the origin cannot deny creating the message. Next, the valid message and digest are placed on the queue and the recipient is notified that the message is available.

In one embodiment of the present invention, the system generates a request at the recipient to receive the message from the queue. Next, the system creates a signature for the request using a recipient private encryption key. The system then sends the request and the signature to the queue. Next, the system validates the request at the queue using the signature and a recipient public encryption key. If the request is valid, the system dequeues the message from the queue and sends the digest to the recipient. The recipient then signs the digest using the recipient private encryption key, thereby creating a signed digest, and returns the signed digest to the queue. Next, the queue validates the signed digest using the recipient public encryption key. The signed digest of the recipient is stored persistently along with other recipient information such as the identity of the recipient, the time at which the message was received, etc. If the signature is valid, the recipient cannot deny requesting to receive the message. Finally, the queue sends the message to the recipient.

In one embodiment of the present invention, the system passes the message and the digest through a plurality of queues between the origin and the recipient, whereby the recipient and the origin are subscribers of different queues.

In one embodiment of the present invention, the system passes the message and the digest through a plurality of databases, wherein each database in the plurality of databases includes at least one queue of the plurality of queues.

In one embodiment of the present invention, the origin public encryption key and the origin private encryption key are a key pair defined within a public key encryption system.

In one embodiment of the present invention, the recipient public encryption key and the recipient private encryption key are a key pair defined within a public key encryption system.

In one embodiment of the present invention, the digest is computed using message digest 2 (MD2), message digest 4 (MD4), message digest 5 (MD5), secure hash algorithm (SHA), or secure hash algorithm 1 (SHA1).

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Computing Systems

Figure 1:
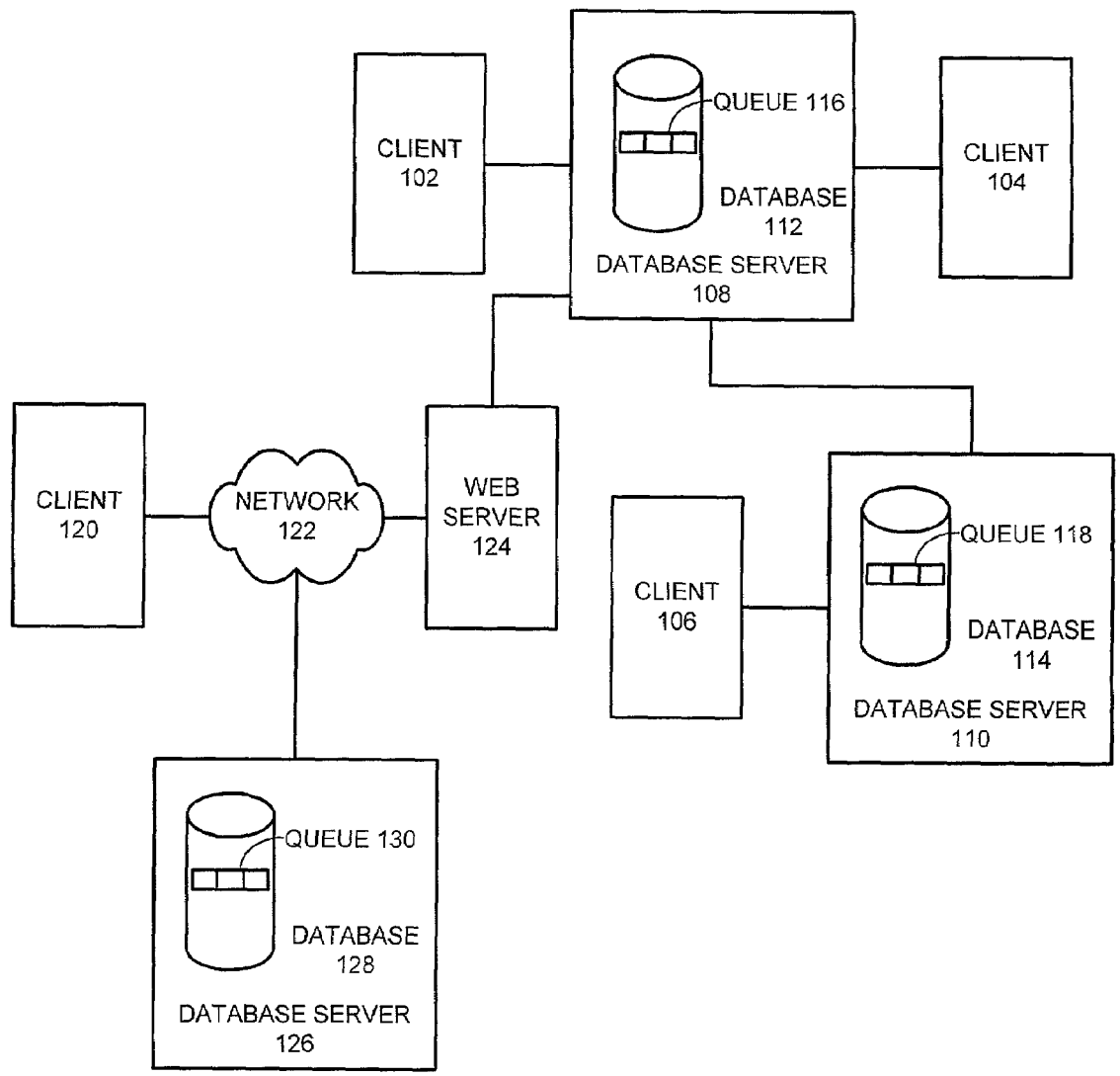
FIG. 1 illustrates computers coupled together in accordance with an embodiment of the present invention.

FIG. 1 illustrates computers coupled together in accordance with an embodiment of the present invention. The system includes clients 102, 104, 106, and 120, database servers 108, 110, and 126, and web server 124. Clients 102, 104, 106, and 120, database servers 108, 110, and 126, and web server 124 can generally include any type of computer system, including, but not limited to, a computer system based on a microprocessor, a mainframe computer, a digital signal processor, a portable computing device, a personal organizer, a device controller, and a computational engine within an appliance. Note that it will be obvious to a practitioner with ordinary skill in the art that this system is not limited to the number of clients, database servers and web servers shown, but can include any number of these devices.

Database servers 108, 110 and 126 include databases 112, 114, and 128 respectively, and databases 112, 114, and 128 include queues 116, 118 and 130, respectively. Databases 112, 114, and 128 can include any type of system for storing data in non-volatile storage. This includes, but is not limited to, systems based upon magnetic, optical, and magneto-optical storage devices, as well as storage devices based on flash memory and/or battery-backed up memory.

Clients 102 and 104 are coupled to database server 108 across communication links or networks using a database specific language such as procedural language/structured query language (PL/SQL) from Oracle® Corporation. Oracle® is a trademark or registered trademark of Oracle® Corporation in the United States of America and other countries. Client 106 is coupled to database server 110 across a communication link using the same database specific language. Additionally, database server 108 is coupled to database server 110 across a communication link also using the same database specific language.

Client 120 and database server 126 are coupled to web server 124 across network 122. Network 122 can generally include any type of wire or wireless communication channel capable of coupling together computing nodes. This includes, but is not limited to, a local area network, a wide area network, or a combination of networks. In one embodiment of the present invention, network 122 includes the Internet. Client 120 and database server 126 communicate with web server 124 as described in the related application by Bhagat V. Nainani, Neerja Bhatt, Shailendra K. Mishra, Krishnan Meiyyappan, Namit Jain, and Wei Wang entitled, "Method and Apparatus to Facilitate Accessing Communication Queues Using a Public Network," having Ser. No. 10/027,100, and filing date 19 Dec. 2001, which is incorporated herein by reference.

When the system is in operation, any of clients 102, 104, 106, and 120 can take on the role of message originator or message recipient. Additionally, queues 116, 118, and 130 can take on the role of originator or recipient for messages destined for a client coupled to a different database server. The system computes digests of the messages and provides signatures to prevent repudiation of originating a message and requesting receipt of a message as described below in conjunction with FIGS. 2 through 6.

Originating Client

Figure 2:
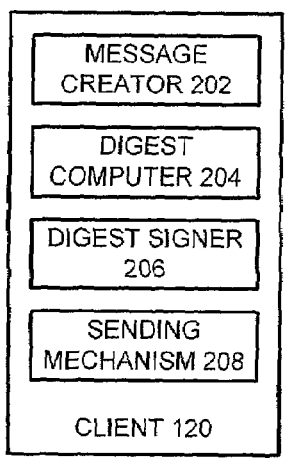
FIG. 2 illustrates client 120 in accordance with an embodiment of the present invention.

FIG. 2 illustrates client 120 in accordance with an embodiment of the present invention. Message originating client 120 includes message creator 202, digest computer 204, digest signer 206, and sending mechanism 208. Note that any client within the system can be a message originating client and can be configured in like manner.

Message creator 202 creates messages to be sent to a queue such as queue 116 within database 112. Digest computer 204 computes a digest of the message using any available mechanism for creating a digest such as message digest 2 (MD2), message digest 4 (MD4), message digest 5 (MD5), secure hash algorithm (SHA), or secure hash algorithm 1 (SHA1).

After digest computer 204 has created a digest of the message, digest signer 206 digitally signs the message using a cryptographic process. Examples of these cryptographic processes for digitally signing messages include the Rivest-Shamir-Adleman (RSA) and pretty-good-privacy (PGP) processes. These processes are well known and will not be discussed further herein.

Sending mechanism 208 sends the message and the signed digest to queue 116 for delivery to the recipient. These messages are propagated, possibly across public networks, as described in the co-pending non-provisional application by Bhagat V. Nainani, Neerja Bhatt, Shailendra K. Mishra, Krishnan Meiyyappan, Namit Jain, and Wei Wang entitled, "Method and Apparatus to Facilitate Access and Propagation of Messages in Queues Using a Public Network."

Database Server 108

Figure 3:
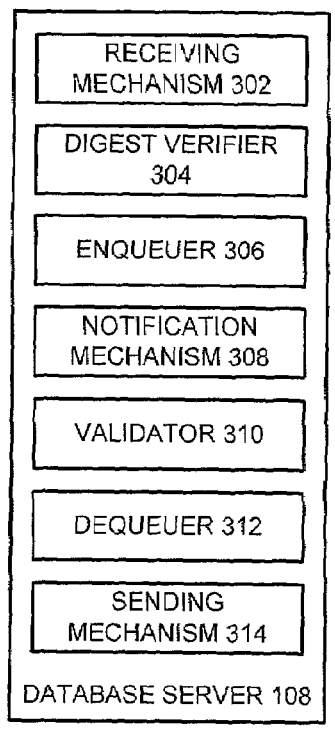
FIG. 3 illustrates database server 108 in accordance with an embodiment of the present invention.

FIG. 3 illustrates database server 108 in accordance with an embodiment of the present invention. Database server 108 includes receiving mechanism 302, digest verifier 304, enqueuer 306, notification mechanism 308, validator 310, dequeuer 312, and sending mechanism 314.

Receiving mechanism 302 receives the message and the signed digest from client 120. Digest verifier 304 verifies the digest by first verifying the signature using the cryptographic process selected by digest signer 206. If the signature is valid—indicating that client 120 signed the digest—digest verifier 304 then verifies that the digest was created from the message using the same method used by digest computer 204.

After the signature and the digest have been verified, enqueuer 306 enqueues the message and signed digest on queue 116. Next, notification mechanism 308 notifies the recipient that the message is available. The recipient, say client 104, provides requests and responses as described below in conjunction with FIG. 4. When receiving mechanism 302 receives a request for the message from client 104, validator 310 validates the signature on the request to ensure that the request was received from client 104.

If the signature is valid, dequeuer 312 dequeues the message and digest from queue 116 and causes sending mechanism 314 to send the digest to client 104. Client 104 signs and returns the digest as described below in conjunction with FIG. 4. When receiving mechanism 302 receives this signed digest from the recipient, validator 310 validates that the digest was signed by client 104 indicating that client 104 requested the message. After validating this signature, sending mechanism 314 sends the message to client 104. This processing ensures that the originator of the message cannot deny sending the message and the recipient of the message cannot deny asking to receive the message.

Receiving Client

Figure 4:
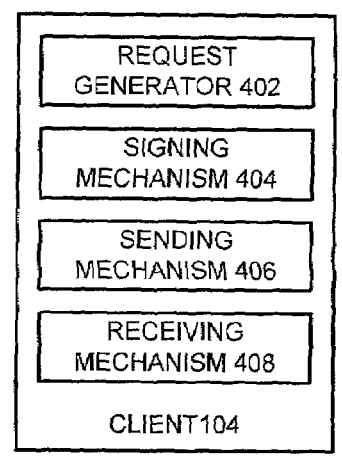
FIG. 4 illustrates client 104 in accordance with an embodiment of the present invention.

FIG. 4 illustrates client 104 in accordance with an embodiment of the present invention. Client 104 includes request generator 402, signing mechanism 404, sending mechanism 406, and receiving mechanism 408. When receiving mechanism 408 receives notification from database server 108 that a message has been enqueued on queue 116 for client 104, request generator 402 generates a request to download the message. Signing mechanism 404 signs the request using a cryptographic process such as RSA or PGP. Sending mechanism 406 sends the signed request to database server 108.

Subsequently, receiving mechanism receives the message digest from database server 108. Client 104 uses signing mechanism 404 to sign the digest, thereby providing proof that the digest was received by client 104. Sending mechanism 406 then sends the signed digest back to database server 108. Finally, receiving mechanism receives the message from database server 108.

Creating a Message

Figure 5:
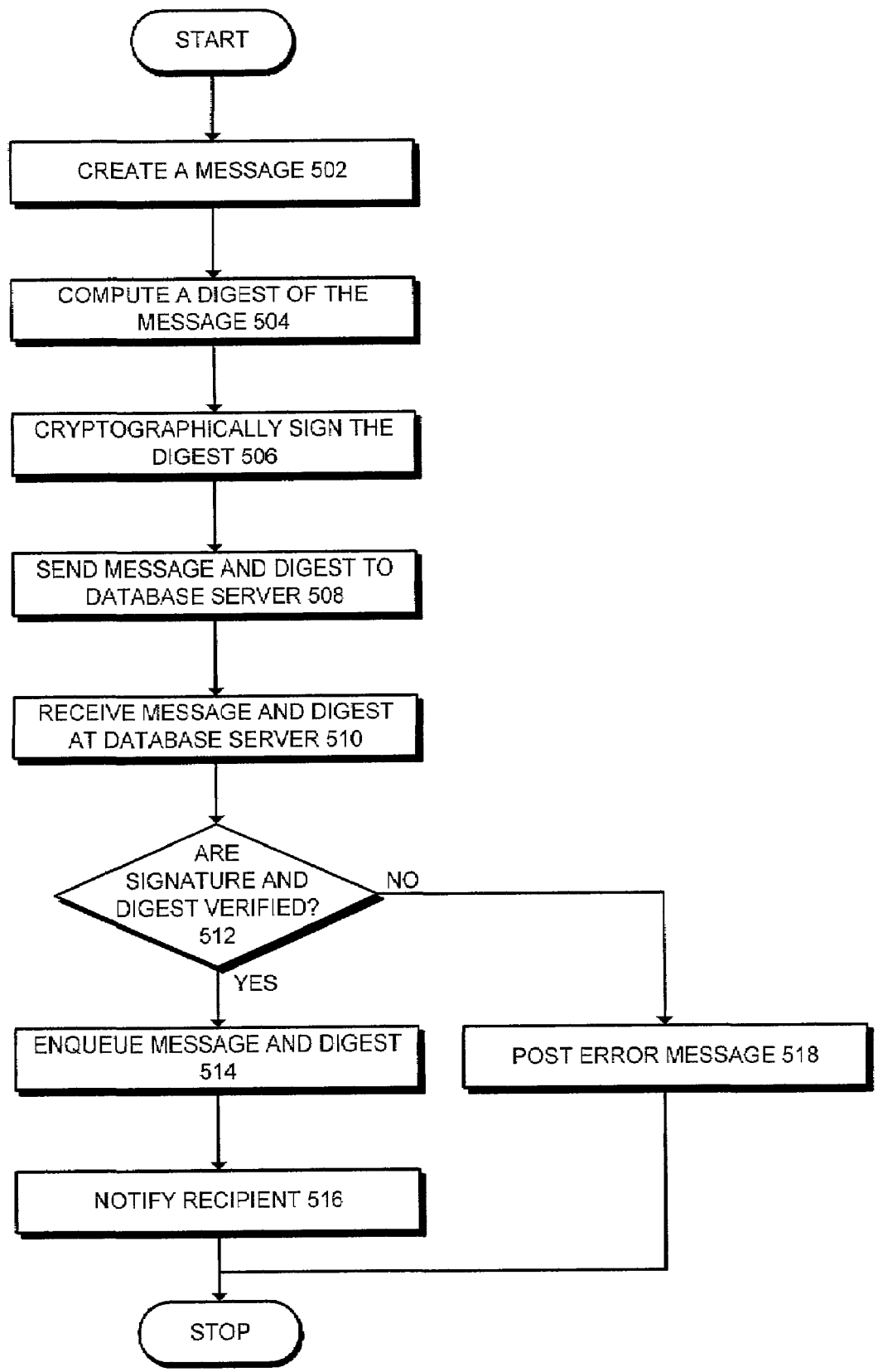
FIG. 5 is a flowchart illustrating the process of creating and enqueueing a message in accordance with an embodiment of the present invention.

FIG. 5 is a flowchart illustrating the process of creating and enqueueing a message in accordance with an embodiment of the present invention. The system starts when message creator 202 creates a message (step 502). Next, digest computer 204 creates a digest of the message using any available mechanism for creating a digest such as MD2, MD4, MD5, SHA, or SHA1 (step 504). Digest signer 206 then signs the digest using a cryptographic mechanism such as RSA or PGP (step 506). After the digest has been signed, sending mechanism 208 sends the message and the signed digest to a database server such as database server 108 so that database server 108 can place the message and signed digest on queue 116 (step 508).

Receiving mechanism 302 receives the message and signed digest at database server 108 (step 510). Next, digest verifier 304 determines if the signature and digest are valid (step 512). If so, enqueuer 306 enqueues the message and the signed digest on queue 116 within database 112 (step 514). Notification mechanism 308 then notifies the recipient that the message is available on queue 116 (step 516). If the signature or the digest is not valid at 512, database server 108 posts an error message using the normal error reporting mechanism of database server 108 (step 516).

Delivering a Message

Figure 6:
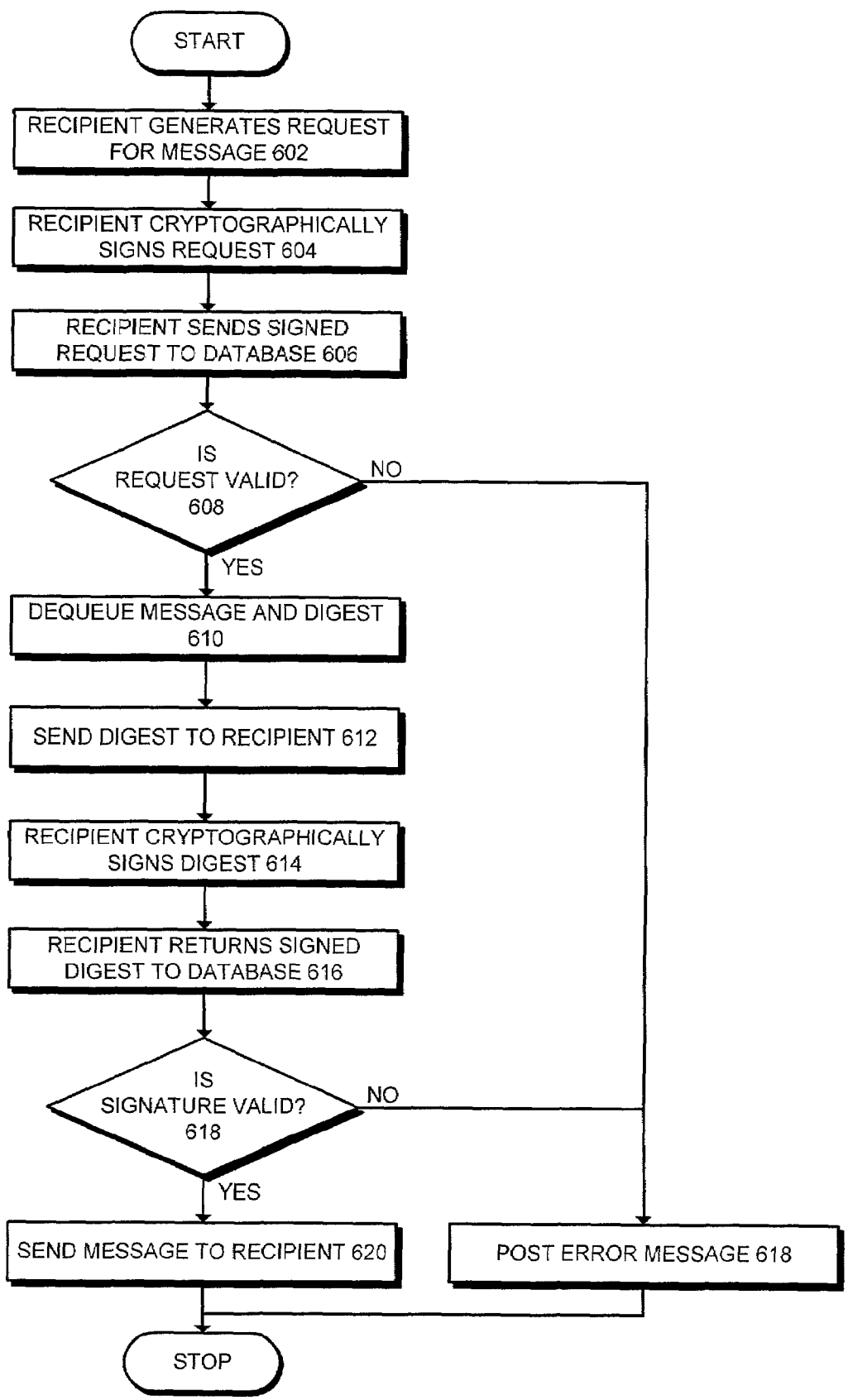
FIG. 6 is a flowchart illustrating the process of dequeueing and delivering a message in accordance with an embodiment of the present invention.

FIG. 6 is a flowchart illustrating the process of dequeueing and delivering a message in accordance with an embodiment of the present invention. The system starts when request generator 402 within client 104 generates a request for the message (step 602). Next, signing mechanism 404 cryptographically signs the request using an available cryptographic system such as RSA or PGP (step 604).

After the request has been signed, sending mechanism 406 sends the signed request to database server 108 (step 606). Validator 310 within database server 108 then determines if the request has a valid signature (step 608). If so, dequeuer 312 dequeues the message and digest from queue 116 (step 610). Next, sending mechanism 314 sends the digest to client 104 (step 612).

Signing mechanism 404 then cryptographically signs the digest to verify that client 104 has requested the message (step 614). Next, sending mechanism 406 returns the signed digest to database server 108 (step 616). Validator 310 within database server 108 than verifies the signature on the digest to determine if the digest was signed by client 104 (step 618). If so, sending mechanism sends the message to client 104 (step 620). If the request is not valid at 608 or if the signature is not valid at 618, database server 108 posts an error message using the normal error reporting mechanism of database server 108 (step 618).

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for enabling a network of database systems to provably track a message, wherein the message is created at an origin system and is destined to a recipient system, wherein the message passes through a first database system and a second database system, and wherein the origin system, the recipient system, the first database system, and the second database system are different from one another, comprising:

determining a first digest of the message at the first database system;

sending the first digest from the first database system to the second database system;

signing the first digest at the second database system using a second private encryption key that is associated with the second database system;

sending the signed first digest from the second database system to the first database system;

validating the signed first digest at the first database system using a second public encryption key that is associated with the second private encryption key; and if the signed first digest is valid, persistently storing the signed first digest at the first database system, thereby enabling the first database system to prove that the second database system requested to receive the message.

2. The method of claim 1, wherein the second public encryption key and the second private encryption key are a key pair of a public key encryption system.

3. The method of claim 1, wherein determining the first digest involves using one of message digest 2 (MD2), message digest 4 (MD4), message digest 5 (MD5), secure hash algorithm (SHA), and secure hash algorithm 1 (SHA1).

4. A computer-readable storage medium storing instructions that when executed by a computer cause the computer to perform a method for enabling a network of database systems to provably track a message, wherein the message is created at an origin system and is destined to a recipient system, wherein the message passes through a first database system and a second database system, and wherein the origin system, the recipient system, the first database system, and the second database system are different from one another, the method comprising:

determining a first digest of the message at the first database system;

sending the first digest from the first database system to the second database system;

signing the first digest at the second database system using a second private encryption key that is associated with the second database system;

sending the signed first digest from the second database system to the first database system;

validating the signed first digest at the first database system using a second public encryption key that is associated with the second private encryption key; and if the signed first digest is valid, persistently storing the signed first digest at the first database system, thereby enabling the first database system to prove that the second database system requested to receive the message.

5. The computer-readable storage medium of claim 4, wherein the second public encryption key and the second private encryption key are a key pair of a public key encryption system.

6. The computer-readable storage medium of claim 4, wherein determining the first digest involves using one of message digest 2 (MD2), message digest 4 (MD4), message digest 5 (MD5), secure hash algorithm (SHA), and secure hash algorithm 1 (SHA1).

7. An apparatus for enabling a network of database systems to provably track a message, wherein the message is created at an origin system and is destined to a recipient system, wherein the message passes through a first database system and a second database system, and wherein the origin system, the recipient system, the first database system, and the second database system are different from one another, comprising:

a determining mechanism that is configured to determine a first digest of the message at the first database system;

a first sending mechanism that is configured to send the first digest from the first database system to the second database system;

a signing mechanism that is configured to use a second private encryption key that is associated with the second database system;

a second sending mechanism that is configured to send the signed first digest from the second database system to the first database system;

a validating mechanism that is configured to validate the signed first digest at the first database system using a second public encryption key that is associated with the second private encryption key; and a storing mechanism, wherein if the signed first digest is valid, the storing mechanism is configured to persistently store the signed first digest at the first database system, thereby enabling the first database system to prove that the second database system requested to receive the message.

8. The apparatus of claim 7, wherein the second public encryption key and the second private encryption key are a key pair of a public key encryption system.

9. The apparatus of claim 7, wherein determining the first digest involves using one of message digest 2 (MD2), message digest 4 (MD4), message digest 5 (MD5), secure hash algorithm (SHA), and secure hash algorithm 1 (SHA1).

\* \* \* \* \*